US009222452B1

(12) United States Patent
Shore

(10) Patent No.: US 9,222,452 B1
(45) Date of Patent: Dec. 29, 2015

(54) AUTOMOBILE FUEL SYSTEM PRESSURIZATION APPARATUSES AND METHODS

(71) Applicant: Michael W. Shore, Dallas, TX (US)

(72) Inventor: Ronald J. Shore, Longview, TX (US)

(73) Assignee: Michael W. Shore, Dallas, TX (US)

( * ) Notice: Subject to any disclaimer, the term of this patent is extended or adjusted under 35 U.S.C. 154(b) by 0 days.

(21) Appl. No.: 14/478,181

(22) Filed: Sep. 5, 2014

Related U.S. Application Data

(63) Continuation-in-part of application No. 14/180,828, filed on Feb. 14, 2014.

(60) Provisional application No. 61/781,339, filed on Mar. 14, 2013.

(51) Int. Cl.
| | |
|---|---|
| B65B 31/00 | (2006.01) |
| F02M 59/42 | (2006.01) |
| F04B 33/00 | (2006.01) |
| F04B 37/10 | (2006.01) |
| F02M 37/18 | (2006.01) |
| F02M 37/16 | (2006.01) |

(52) U.S. Cl.
CPC ............... *F02M 59/42* (2013.01); *F04B 33/00* (2013.01); *F04B 37/10* (2013.01); *F02M 37/16* (2013.01); *F02M 37/18* (2013.01)

(58) Field of Classification Search
CPC ....... F02M 37/16; F02M 37/18; F02M 59/42; F04B 33/00; F04B 37/10
USPC ........................... 123/179.11, 179.12, 179.17; 137/565.25; 141/4, 64
See application file for complete search history.

(56) References Cited

U.S. PATENT DOCUMENTS

| | | | | | |
|---|---|---|---|---|---|
| 1,149,661 | A | * | 8/1915 | McCarthy | ................ 123/179.11 |
| 1,248,957 | A | * | 12/1917 | Voigt | ............................. 251/115 |
| 1,366,180 | A | * | 1/1921 | Herzmark | ................ 123/179.11 |
| 2,956,737 | A | | 10/1960 | Hager | |
| 4,428,478 | A | * | 1/1984 | Hoffman | ..................... 206/315.9 |
| 4,497,290 | A | * | 2/1985 | Harris | ....................... 123/179.11 |
| 5,427,091 | A | * | 6/1995 | Phillips | .................... 128/205.15 |
| 6,345,958 | B1 | * | 2/2002 | Chen | .............................. 417/63 |
| 2010/0326567 | A1 | | 12/2010 | McCollom | |

OTHER PUBLICATIONS

International Search Report and Written Opinion.

* cited by examiner

*Primary Examiner* — Jason K Niesz
(74) *Attorney, Agent, or Firm* — Panitch Schwarze Belisario & Nadel LLP

(57) ABSTRACT

Automobile fuel system pressurization apparatuses include systems that are positionable against or insertable into a filler neck of a fuel tank to provide quicker methods of recharging a fuel pump and a fuel line in an automobile without having to run a starter motor for an extended period. One embodiment of the automobile fuel system pressurization apparatus includes an air pump and an inflatable bladder coupled to the air pump, which is deformable between an expanded state and a deflated state. Another embodiment of the automobile fuel system pressurization apparatus includes an air pump coupled to a filler neck sealing element. The air pump directly provides compressed air to the fuel tank, after compressed air is routed through a centrally positioned thru-hole of the filler neck sealing element. Methods of pressurizing an automobile fuel tank to prime a fuel pump, using automobile fuel system pressurization apparatus are also disclosed.

15 Claims, 7 Drawing Sheets

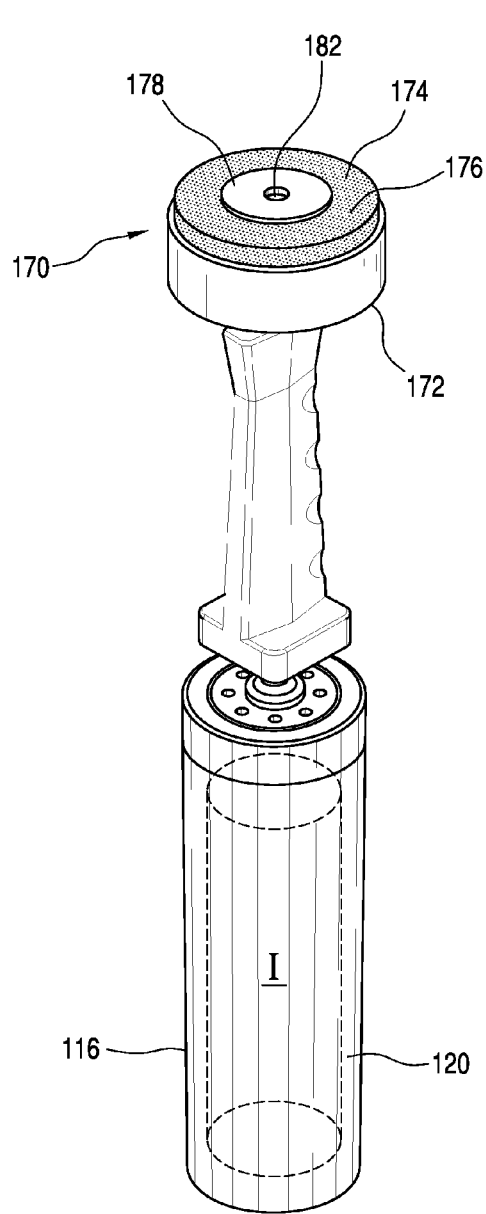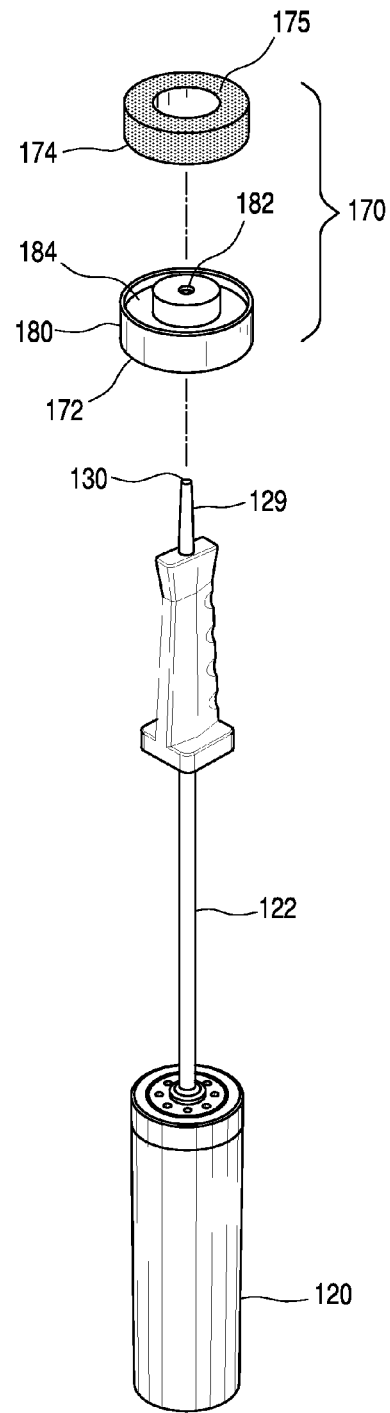
FIG. 4A
FIG. 4B

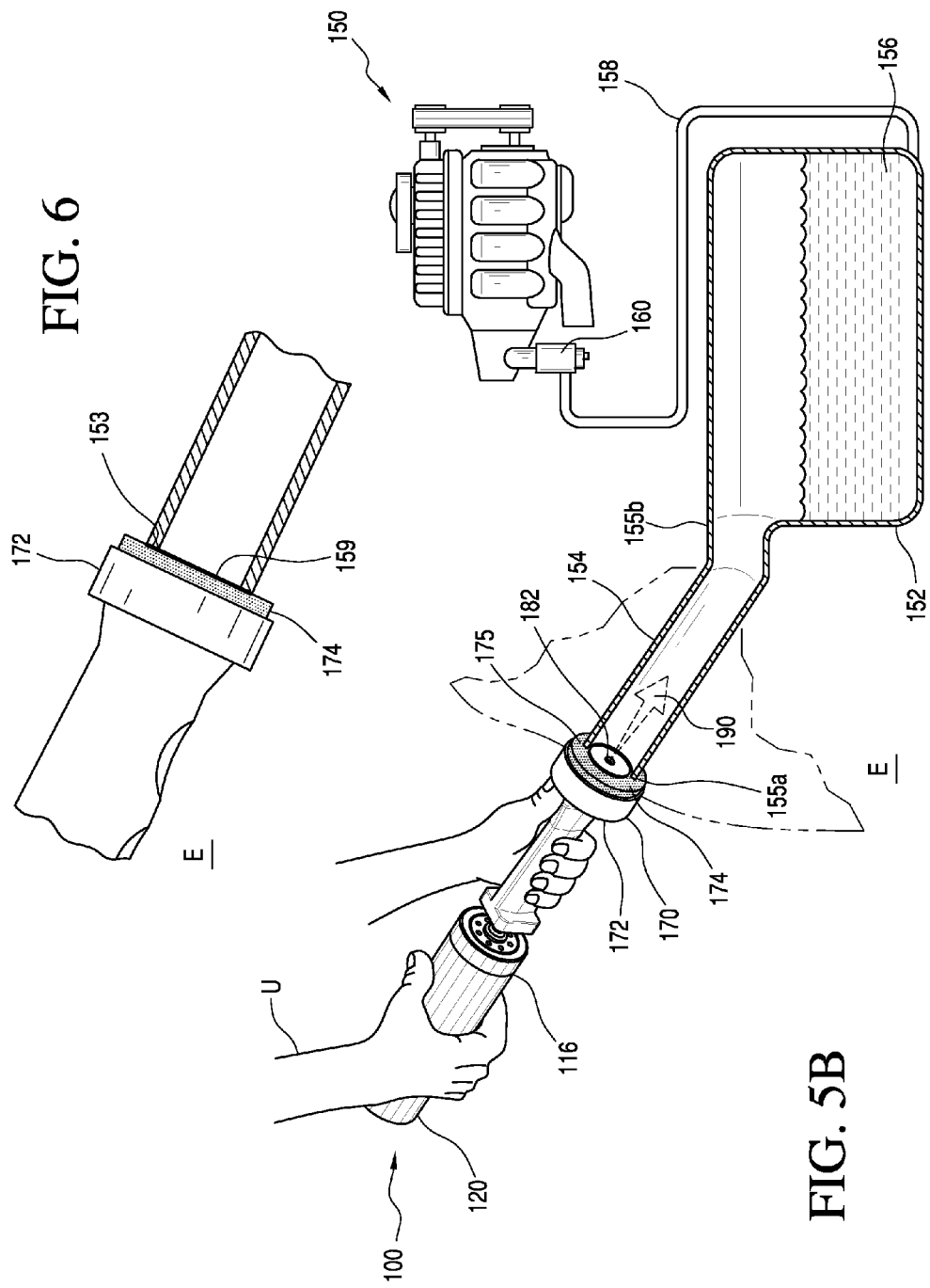

AUTOMOBILE FUEL SYSTEM PRESSURIZATION APPARATUSES AND METHODS

CROSS REFERENCE TO RELATED APPLICATIONS

This application is a continuation-in-part of U.S. application Ser. No. 14/180,828, filed on Feb. 14, 2014, entitled "Automobile Fuel System Pressurization Apparatus and Method," which claims the benefit of U.S. Provisional Application No. 61/781,339, filed on Mar. 14, 2013, entitled "Automobile Fuel System Pressurization Apparatus and Method." The entire contents of each priority application are incorporated by reference herein.

BACKGROUND OF THE INVENTION

Embodiments of the present invention relate generally to apparatuses and methods for pressurizing an automobile fuel system, and more particularly, to apparatuses and methods for pressurizing an automobile fuel system, using systems that are insertable into or positionable against a filler neck of a fuel tank.

Prior to fuel injection becoming the primary method for admitting fuel to an automotive engine, automobiles were typically equipped with a carburetor and mechanical fuel pump mounted on the engine. Upon initiation of operation of the engine by the starter or while the engine was running, the fuel pump would draw fuel (e.g., gasoline) from the fuel tank into a fuel line for use in the carburetor. Under typical operating conditions, the fuel line and fuel pump remained primed such that a subsequent start-up of the engine could be accomplished quickly and efficiently.

However, if the automobile remains idle for a period of several weeks or more, or runs out of fuel, the fuel pump and fuel line must be recharged with fuel. In small engine equipment, such as lawn mowers, leaf blowers, or the like, a primer button is provided to feed fuel from the fuel tank to the carburetor prior to actuating the engine. No such configuration, however, is provided for automobile engines. The only way to recharge the fuel pump and the fuel line is by running the engine with the starter motor for possibly several minutes or more. Typically, however, a long fuel line from the fuel tank that extends to the fuel pump is primed before the fuel pump. Recharging the fuel pump and fuel line in this manner can be difficult, particularly where an automobile has remained idle for an extended period of time. Under these conditions, a car battery may not have enough charge to sustain actuation of the starter motor long enough to adequately recharge the fuel system.

It is therefore desirable to provide quicker methods of recharging the fuel pump and a fuel line in an automobile without having to run the starter motor for an extended period of time.

BRIEF SUMMARY OF THE INVENTION

Briefly stated, a first embodiment of the present invention comprises an automobile fuel system pressurization apparatus, including an air pump and an inflatable bladder, having a proximal end, a distal end, an exterior surface, and an inlet, accessing an interior of the bladder. The inflatable bladder is deformable between an expanded state and a deflated state. In the expanded state, the exterior surface of the inflatable bladder is configured to provide a substantially air-tight seal in a filler neck of a fuel tank. The air pump is coupled to the inlet of the inflatable bladder and configured to supply compressed air to the interior of the inflatable bladder. A pressure relief valve is disposed at the distal end of the inflatable bladder and is in fluid communication with the interior of the inflatable bladder. When the inflatable bladder is in the expanded state, the pressure relief valve is configured to release a portion of the compressed air from the interior of the inflatable bladder into the fuel tank.

A second embodiment of the present invention comprises a method of pressurizing an automobile fuel tank to prime a fuel pump using an apparatus, including an inflatable bladder deformable between an expanded state and a deflated state, a pump coupled to an inlet of the inflatable bladder, and a pressure relief valve at a distal end of the inflatable bladder and in fluid communication with an interior of the inflatable bladder. The method includes inserting the inflatable bladder in the deflated state into a filler neck of the fuel tank. The pump provides a first amount of compressed air to the interior of the inflatable bladder to deform the inflatable bladder to the expanded state such that an exterior surface of the inflatable bladder forms a substantially air-tight seal in the filler neck of the fuel tank. The pump can also provide a second amount of compressed air to the interior of the inflatable bladder. The pressure relief valve releases a portion of the first and/or second amount of air from the interior of the inflatable bladder to the fuel tank.

A third embodiment of the present invention comprises an automobile fuel system pressurization apparatus, including an air pump coupled to a filler neck sealing element. The filler neck sealing element is configured to be positioned against a filler neck coupled to a fuel tank. The filler neck sealing element includes a substantially rigid body and a substantially deformable body disposed on an inner element of the substantially rigid body. The substantially rigid body includes a centrally positioned thru-hole for coupling with an outlet of the air pump. Upon assembly of the filler neck sealing element with the air pump, the air pump is configured to supply compressed air to the interior of the fuel line through the centrally positioned thru-hole of filler neck sealing element. The filler neck sealing element sufficiently seals the fuel line, by providing a substantially air-tight seal against the filler neck of the fuel tank. The air pump is coupled to the filler neck sealing element to directly provide compressed air to the fuel tank, after compressed air is routed through the centrally positioned thru-hole of the filler neck sealing element.

A fourth embodiment of the present invention comprises a method of pressurizing an automobile fuel tank to prime a fuel pump, using an automobile fuel system pressurization apparatus, including a filler neck sealing element and a pump coupled to an inlet of the filler neck sealing element. The method includes positioning the filler neck sealing element of the apparatus against a filler neck of a fuel tank, substantially sealing the filler neck sealing element against the filler neck of the fuel tank, and supplying compressed air from the air pump to the interior of the fuel line through a centrally positioned thru-hole in the filler neck sealing element. As such, the pump provides compressed air directly to the fuel tank through the centrally positioned thru-hole of the filler neck sealing element.

BRIEF DESCRIPTION OF THE DRAWINGS

The foregoing summary, as well as the following detailed description of preferred embodiments of the invention, will be better understood when read in conjunction with the appended drawings. For the purpose of illustration, there are shown in the drawings embodiments which are presently

FIG. 4A is a side perspective view of an apparatus according to a second preferred embodiment of the present invention;

FIG. 4B is a partially exploded side perspective view of the apparatus shown in FIG. 4A;

FIG. 5B is a schematic view of the apparatus of FIG. 4 in use with the apparatus being in a second position against a filler neck of a fuel tank; and FIG. 6 is a side elevational view of the apparatus shown in FIG. 5A or 5B positioned against a filler neck of a fuel tank.

DETAILED DESCRIPTION OF THE INVENTION

Figure 1:
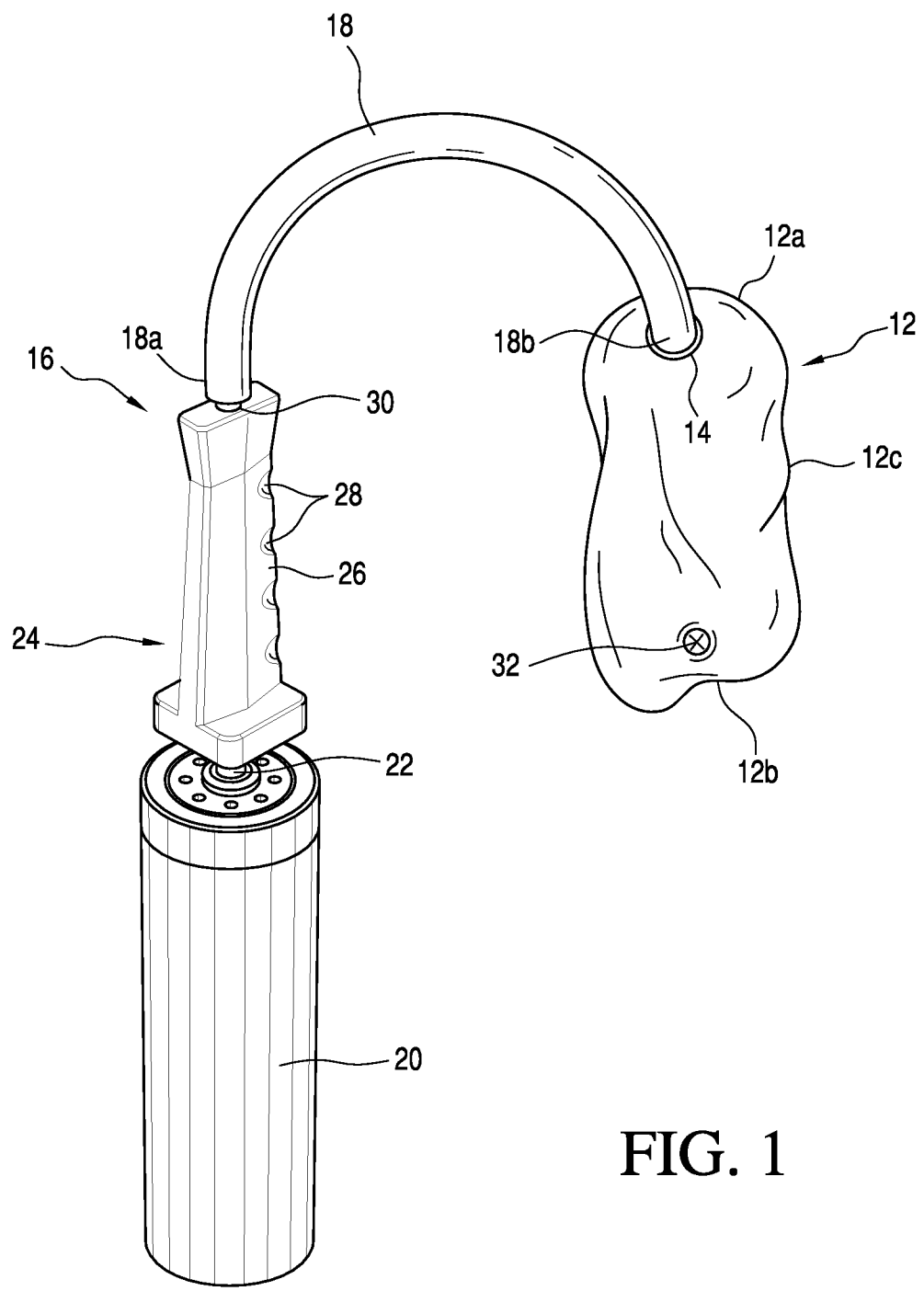
FIG. 1 is a side perspective view of an apparatus according to a first preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the apparatus and designated parts thereof. The terminology includes the above-listed words, derivatives thereof, and words of similar import. Additionally, the words "a" and "an", as used in the claims and in the corresponding portions of the specification, mean "at least one."

Referring to the drawings in detail, wherein like reference numerals may indicate like elements, there is shown in FIG. 1 an apparatus 10 for pressurizing an automobile fuel system in accordance with a first preferred embodiment of the present invention. The apparatus includes an inflatable bladder 12 having a proximal bladder end 12a and a distal bladder end 12b and an exterior bladder surface 12c. The inflatable bladder 12 is preferably formed of rubber or other type of elastic elastomeric material. The inflatable bladder 12 further includes a hollow interior 13 (represented schematically by dashed lines in FIG. 3B) configured to retain air, that may be received through an inlet 14 in fluid communication with the interior 13 of the inflatable bladder 12, where the inlet 14 is preferably disposed at the proximal bladder end 12a.

Figure 3A:
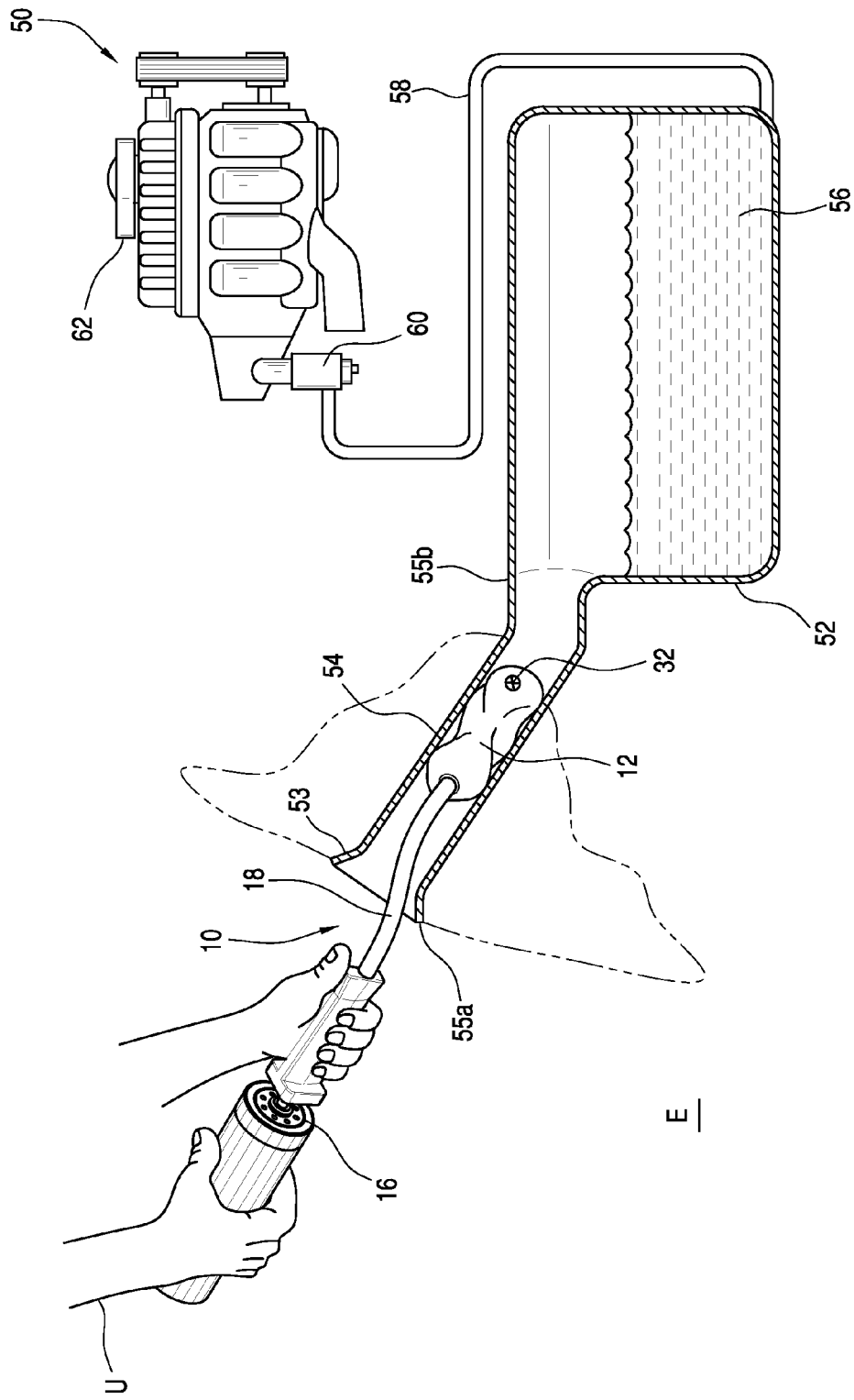
FIG. 3A is a schematic view of the apparatus of FIG. 1 in use with the bladder in a deflated state.
Figure 3B:
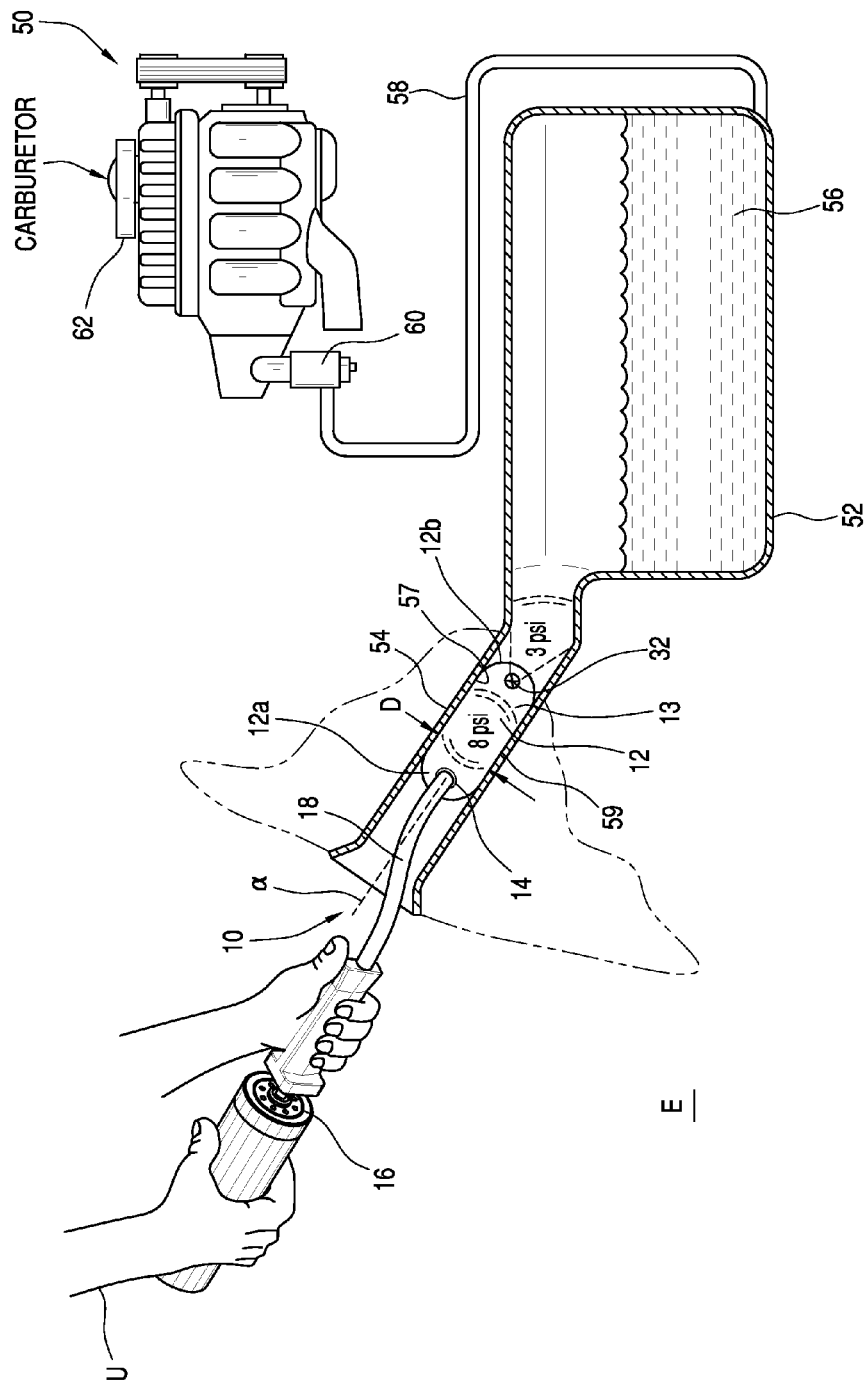
FIG. 3B is a schematic view of the apparatus of FIG. 1 in use with the bladder in an expanded state.

The inflatable bladder 12 is preferably deformable between a deflated state, such as that shown in FIGS. 1 and 3A, and an expanded state, such as that shown in FIG. 3B. Referring particularly to FIG. 1, in the deflated state, little air contained within the inflatable bladder 12. As such, the exterior bladder surface 12c is generally formless (i.e., the exterior surface 12c does not define a definite shape and is easily stretched, bent, twisted, manipulated, or the like). With respect to the first preferred embodiment of the invention, FIGS. 3A and 3B schematically show at least a portion of a fuel system 50 of an automobile, which includes a fuel tank 52 and a filler neck 54 in fluid communication therewith for delivery of fuel 56 from an external source (not shown). As referred to herein, the filler neck 54 extends from an entry opening 55a to an exit opening 55b in the fuel system 50. The filler neck shown in FIGS. 3A and 3B includes an optional flared end 53. In the deflated state, as particularly shown in FIG. 3A, the inflatable bladder 12 is insertable at least partially into the filler neck 54.

In the expanded state, as shown in FIG. 3B, the exterior surface 12c of the inflatable bladder 12 is pulled taut by the compressed air contained in the interior 13 of the inflatable bladder 12, and preferably is spherical or ovoid in shape when unconstrained and filled with compressed air. A maximum outer diameter D, measured generally perpendicular to an axis of insertion a to the filler neck 54 (i.e. parallel to a central axis of the filler neck), of the exterior surface 12c of the inflatable bladder 12 in the expanded state is preferably slightly larger than an inner diameter of the filler neck 54 of the automobile fuel system. Accordingly, when the inflatable bladder 12 is in the expanded state and disposed within the filler neck 54 as shown in FIG. 3B, the exterior surface 12c of the inflatable bladder 12 may contact and fit tightly with a press fit against a contour of the inner wall 57 of the filler neck 54 to create a substantially air-tight seal 59. The substantially air-tight seal 59 is effectively used to cut off the fuel tank 52 from the external environment E.

Figure 2:
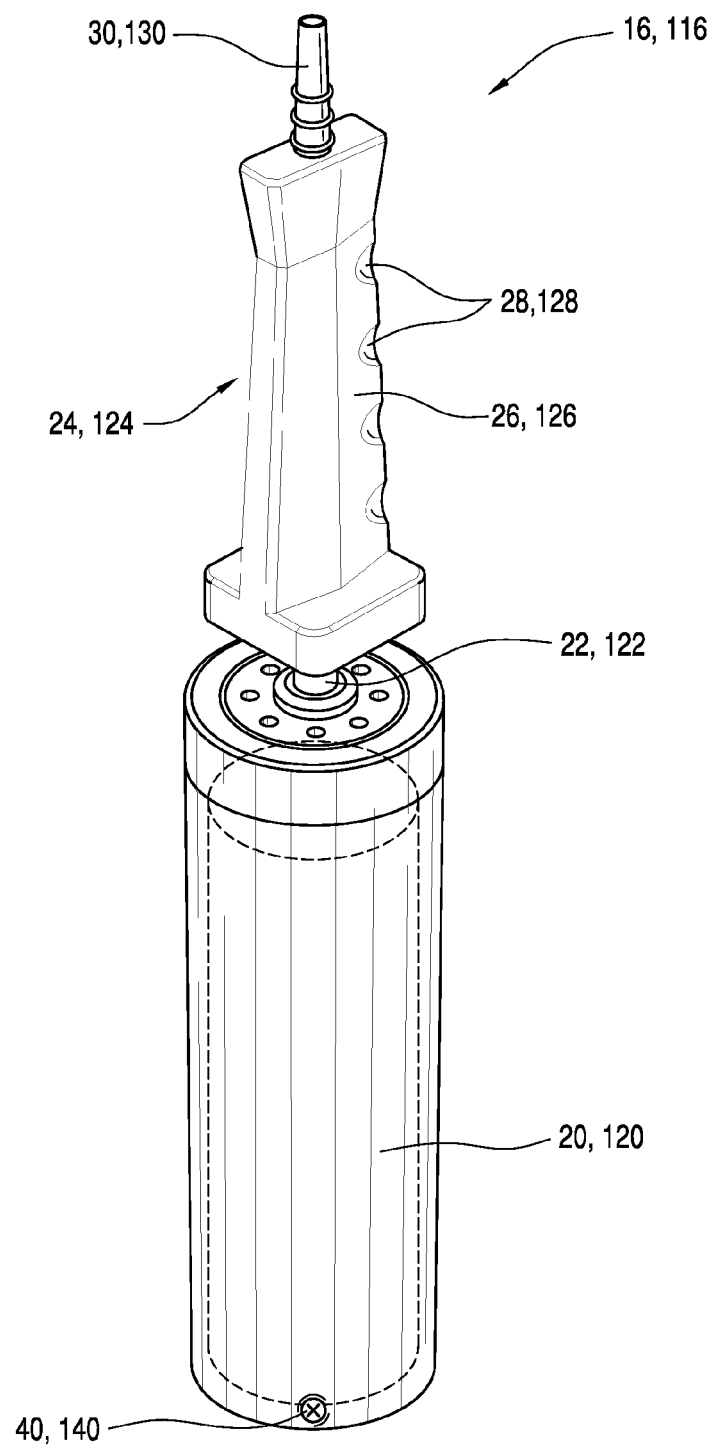
FIG. 2 is a side perspective view of an air pump for use in accordance with preferred embodiments of the present invention.

An air pump 16 is provided for supplying compressed air to the interior 13 of the inflatable bladder 12. The air supplied into the interior 13 of the inflatable bladder may be pressurized to a pressure of 8 psi (pounds per square inch), for example. The air pump 16 is preferably of a manually operated type, since there may be a danger of an electrical or motorized air pump over-inflating and damaging the inflatable bladder 12 and/or the fuel tank 52. One preferred type of air pump 16, shown in FIG. 2, is a handheld piston-type air pump. This type of air pump is advantageous in that it is lightweight and portable, and unlikely to over-pressurize the inflatable bladder 12.

As shown particularly in FIG. 2, the air pump 16 preferably includes a hollow cylinder 20, housing an axially movable piston rod 22 coupled to a hand grip 24. The hand grip 24 may have a hand gripping surface 26 with a plurality of finger slots or grooves 28 formed therein to receive the fingers of the user's hand, which enables a better grip on the air pump 16 to ease the manual actuation of the piston rod 22 within the cylinder 20. At an end of the hand grip 24 opposite to the piston rod 22 is an outlet nozzle 29, having an outlet 30 in fluid communication with an interior of the cylinder 20. As the piston rod 22 is retracted into the cylinder 20, compressed air is forced out of the cylinder 20 through the outlet 30. The air pump 16 shown in FIG. 2, therefore, preferably is configured for use in two positions, a first position where the pump is primed (i.e. filled with compressed air) and a second position where the compressed air is forced out of the cylinder 20 through the outlet. The second position, with respect to the first embodiment of the invention is shown in FIG. 3B.

Although the air pump 16 shown in the drawings and described above is of a particular design, other types of pumps may be used as well. For example, other manual piston type pumps, such as a bicycle air pump or the like, may be used. Rubber bulb-type manual air pumps may also be used. In its broadest sense, the invention is not limited by the type of air pump 16 utilized to provide compressed air or other type of gas to the inflatable bladder 12.

Referring to FIGS. 3A and 3B, during operation of the apparatus 10, the pump 16 is preferably coupled to the inlet 14 of the inflatable bladder 12 by a hose 18 or other type of conduit, which is preferably flexible. Other methods of coupling the inflatable bladder 12 to the air pump 16 may be used, however. The hose 18 includes a first end 18a that is coupled to the outlet 30 of the air pump 16 and a second end 18b that is coupled to the inlet 14 of the inflatable bladder 12. The hose 18 is preferably detachable from one or both of the air pump 16 and inflatable bladder 12. For example, in FIG. 1, the flexible hose 18 is integrally formed with or fixedly attached to the inlet 14 of the inflatable bladder 12. The first end 18a of the hose 18, however, is detachable from the outlet of the air pump 16. It is also contemplated that the flexible hose 18 may be permanently affixed to or integrally formed with both the air pump 16 and inflatable bladder 12. In one configuration, the hose 18 is preferably about twelve inches in length and about ¼ inch in diameter. In a preferred embodiment, the air pump 16 and the inflatable bladder 12 each include a ¼ inch barbed hose fitting (not shown) for connection to the hose 18.

A pressure relief valve 32 is disposed at the distal end 12b of the inflatable bladder 12 and is in fluid communication with the interior thereof. When the inflatable bladder 12 is in the expanded state and the interior thereof is driven beyond a predetermined pressure, the pressure relief valve 32 is configured to release a portion of the compressed air stored in the inflatable bladder 12 into the fuel tank 52. The addition of air pressure to the fuel tank 52 forces fuel 56 into a fuel line 58 toward a fuel pump 60 coupled to a carburetor 62 at the engine (not shown). Thus, it is the air pressure released by the pressure relief valve 32 on the inflatable bladder 12 that primes the automobile fuel system 50 with fuel 56.

An exemplary process for using the apparatus 10 will now be described with reference to FIGS. 3A and 3B. The first end 18a of the hose 18 is preferably coupled to the outlet 30 of the air pump 16, and the inflatable bladder 12, in the deflated state, is inserted into the filler neck 54 of the fuel tank 52. It should be noted that connection of the hose 18 to the air pump 16 may be made after insertion of the inflatable bladder 12 into the filler neck 54, if desired. Of course, in embodiments where the hose 18 and the air pump 16 are integrally or fixedly connected, no prior attachment is necessary.

Grasping the cylinder 20 of the air pump 16 in one hand and the grip portion 24 in the other hand, the user U alternately withdraws and retracts the piston rod 22 in the cylinder 20 to supply a first amount of compressed air to the interior of the inflatable bladder 12 to reach the expanded state (FIG. 3B), thereby sealing the filler neck 54. As additional air pressure is added by the air pump 16 to the interior of the inflatable bladder 12, pressure inside of the inflatable bladder 12 is increased, thereby triggering the pressure relief valve 32 to release some of the compressed air into the fuel tank 52.

When an adequate amount of fuel 56 has been received in the fuel line 58 to prime the fuel pump 60, and fill the float bowl of the carburetor, the inflatable bladder 12 may be allowed to vent at least some of the gas remaining in the interior thereof in order to return to the deflated state to enable withdrawal of the inflatable bladder 12 from the filler neck 54. This may be accomplished, for example, by detaching the air pump 16 from the first end of the hose 18. Venting preferably occurs either just before or after the engine is started. The compressed air in the inflatable bladder 12 can then pass through the hose 18 and vent to atmosphere, thus collapsing the exterior surface 12c of the inflatable bladder 12. In embodiments where the hose 18 cannot be detached from the air pump 16, the air pump 16 may be provided with a release valve (not shown) that can be selectively actuated upon completion of the pressurizing process.

As a safety precaution, in the event the air pump 16 is capable of producing a sufficient amount of pressure to threaten damage to the inflatable bladder 12 and/or the fuel tank 52, the air pump 16, or some other portion of the apparatus 10 may be provided with a safety relief valve 40 to vent excess air pressure to atmosphere and maintain a safe pressure within the inflatable bladder 12 and fuel tank 52.

Figure 5A:
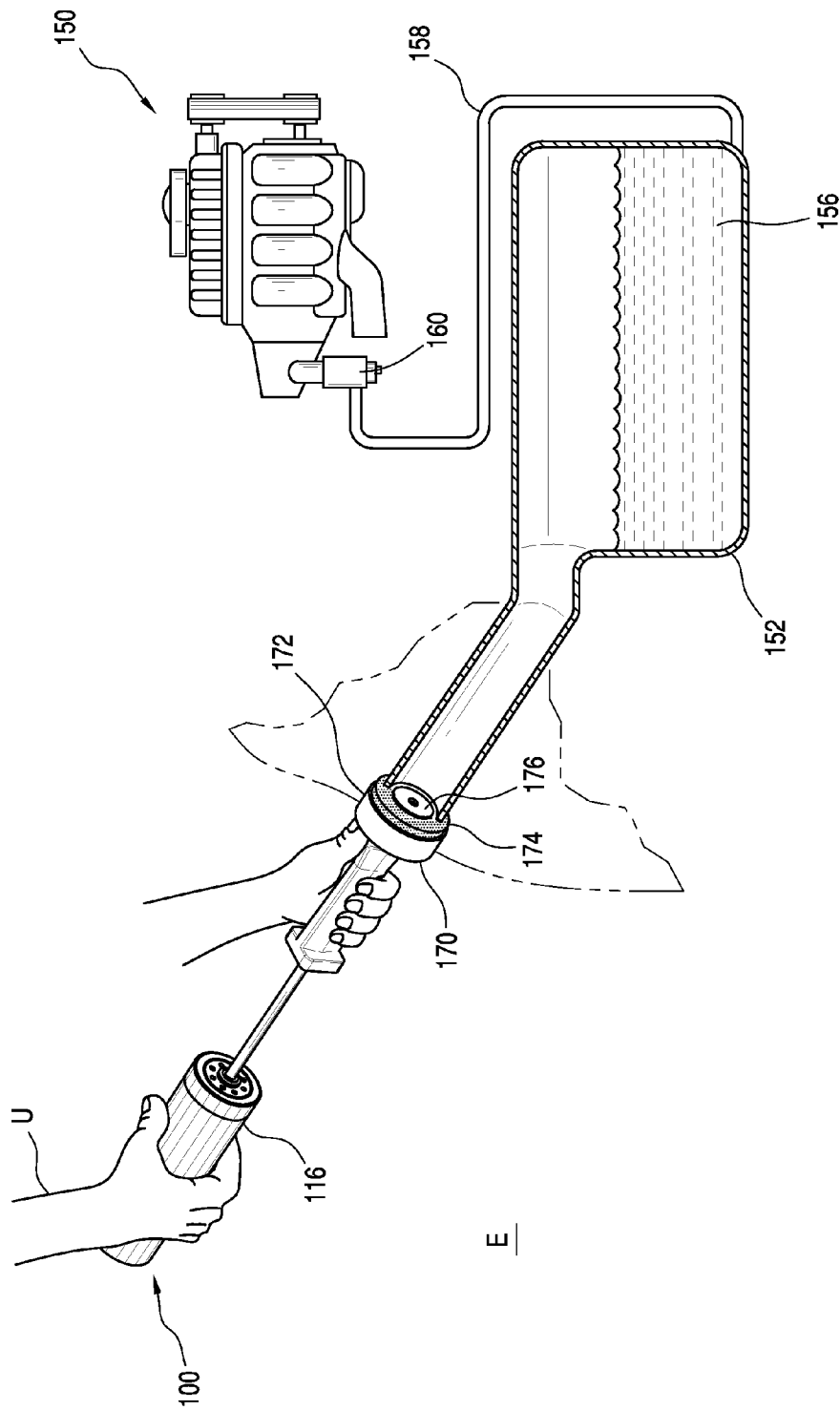
FIG. 5A is a schematic view of the apparatus of FIG. 4 in use with the apparatus being in a first position against a filler neck of a fuel tank.

FIGS. 4A, 4B, 5A, 5B, and 6 show an apparatus 100 for pressurizing an automobile fuel system 150 in accordance with a third preferred embodiment of the present invention. In FIGS. 5A and 5B, the apparatus 100 is shown coupled to an automobile fuel system 150. Reference numerals of the automobile fuel system 150 used with respect to the third preferred embodiment are distinguishable from those of the first preferred embodiment by a factor of one-hundred (100), but otherwise indicate the same elements as indicated in the first preferred embodiment, except as otherwise specified.

Referring to FIGS. 4A and 4B, the apparatus 100 includes an air pump 116 (also shown in FIG. 2) coupled to a filler neck sealing element 170 via a thru-hole 182 centrally positioned in the filler neck sealing element 170. The outlet nozzle 129 of the air pump 116 fits at least partially within thru-hole 182. Preferably, the nozzle 129 of the air pump 116 is removably coupled to the thru-hole 182 of the filler neck sealing element 170.

The filler neck sealing element 170 includes a substantially rigid body 172 and a substantially deformable body 174 coupled to an inner element 176 of the substantially rigid body 172. As shown schematically in FIG. 6, a top surface 175 of the substantially deformable body 174 is configured for positioning against an outer edge 153 of a filler neck 154 to create a substantially air-tight seal 159. The substantially air-tight seal 159 is effectively used to cut off the fuel tank 152 from the external environment E.

As with the first preferred embodiment of the invention, the apparatus 100 includes an air pump 116 used for supplying compressed air 190 (represented by the arrow shown in FIG. 5B). Reference numerals of the air pump 116 used in the third preferred embodiment of the apparatus 100 are distinguishable from those of the first preferred embodiment by a factor of one-hundred (100), but otherwise indicate the same elements as indicated in the first preferred embodiment, except as otherwise specified. When used in this embodiment, the air pump 116, however, supplies compressed air directly to the filler neck 154 such that the air pump 116 releases a portion of compressed air 190 from the interior I (represented by dashed lines shown in FIG. 4A) of the cylinder 120 into the fuel tank 152. The air pump 116 is preferably a manually operated, handheld piston-type air pump.

The air pump 116, when used in accordance with the third embodiment of the present invention, is configured for use in at least two positions, as shown respectively in FIGS. 5A and 5B. In FIG. 5A, the air pump 116 is shown in a first pump position where the pump is primed (i.e. filled at least partially with compressed air). In this position, the piston rod 122 has been at least partially extracted from the hollow cylinder 120. In FIG. 5B, the air pump 116 is shown in a second position, where the compressed air (represented by arrow 190) is forced out of the cylinder 120 through the outlet 130 of the air pump 116 and the piston rod 122 (compare FIGS. 5A and 5B) has been at least partially retracted into the hollow cylinder 120.

Although the air pumps 16, 116 shown in the drawings for the embodiments described herein are of a particular design, other pump types may be used as well. For example, other manual piston type pumps, such as a bicycle pump or the like, may be used. Rubber bulb-type manual pumps may also be used. In its broadest sense, the invention is not limited by the pump type utilized to provide compressed air.

Referring back to FIGS. 5A and 5B, the air pump 116 is configured to pump compressed air 190, which is routed through the thru-hole 182 of filler neck sealing element 170 and thereafter into the automobile fuel system 150. Specifically, the compressed air 190 is routed such that the fuel tank 152 forces fuel 156 into the fuel line 158 towards the fuel pump 160. The fuel pump 160 is coupled to a carburetor 162 at the engine (not shown). Thus, the compressed air released by the air pump 116 routed through the fuel line sealing assembly 170 such that the automobile fuel system 150 is primed with fuel 156.

Referring back to FIGS. 4A and 4B, the substantially rigid body 172 of the filler neck sealing element 170 further includes an inner element 178 coupled to a disc-shaped bottom portion 180. The outer surface 174 of the substantially rigid body 172 is formed on the disc-shaped bottom portion 180. The thru-hole 182 is centrally routed through both the disc-shaped bottom portion 180 and the inner element 176. The inner element 176 is preferably integral with the bottom portion 180 such that the substantially rigid body 172 is formed as one piece. In this one-piece configuration, the substantially rigid body 172 is preferably formed of a substantially rigid material, having substantial corrosion resistance. Such materials include, but are not limited to, stainless steels, galvanized aluminum, composite materials, etc. The substantially deformable body 174 is preferably shaped as a ring and configured to seat on an interior surface 184 of the filler neck sealing element 170. Preferred materials for the substantially deformable body 174 include, but are not limited to foam-based materials, such as polyurethane foams, for example.

An exemplary process for using the apparatus 100 will now be described with reference to FIGS. 5A and 5B. The outlet 130 of the air pump 116 is preferably coupled to the thru-hole 182 of the filler neck sealing element 170, and the filler neck sealing element 170 is positioned against the filler neck 154 of the fuel tank 152. It should be noted that connection of the thru-hole 182 of the filler neck sealing element 170 to the pump 16 may also be integrally or fixedly connected.

During use of the apparatus 100, a user U will alternately extract and retract the piston rod 122 in the cylinder 120 to supply a first amount of compressed air 190 to substantially seal the filler neck 54. A user U may, for example, extract and retract the piston rod 122, by grasping the cylinder 120 of the pump 116 in one hand and the grip portion 124 of the pump 116 in the other hand. As a safety precaution, in the event the pump 116 is capable of producing a sufficient amount of pressure to threaten damage to the fuel tank 152, the pump 116 may be provided with a safety relief valve 140 (e.g., as shown in FIG. 2) to vent excess air pressure to atmosphere and maintain a safe pressure within the fuel tank 152.

It will be appreciated by those skilled in the art that changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

I claim:

1. An automobile fuel system pressurization apparatus, comprising:
    a filler neck sealing element, comprising:
        a substantially rigid body having a bottom portion, an inner element extending from the bottom portion, and a thru-hole centrally disposed therein, and
        a substantially deformable body coupled to the bottom portion and the inner element, wherein the filler neck sealing element is configured to provide a substantially air-tight seal against an outer edge of a filler neck of a fuel tank; and
    an air pump, having a portion, connected to a hand grip, that fits at least partially within the thru-hole of the substantially rigid body such that a surface of the handgrip abuts the substantially rigid body, the air pump being configured to supply compressed air through the filler neck sealing element and release a portion of the compressed air from the interior of the air pump into the fuel tank.

2. The apparatus of claim 1, wherein the air pump is a hand-held piston pump.

3. The apparatus of claim 1, wherein a hand gripping surface is disposed on the hand grip.

4. The apparatus of claim 1, wherein the filler neck sealing element is detachably coupled to the air pump.

5. The apparatus of claim 1, wherein the bottom portion is disc-shaped.

6. The apparatus of claim 1, wherein the substantially deformable body is configured to sit on an interior surface of the bottom-portion.

7. The apparatus of claim 1, wherein the substantially deformable body is configured as a ring.

8. The apparatus of claim 1, wherein the substantially deformable body comprises a foam-based material.

9. The apparatus of claim 1, wherein the air pump comprises a nozzle that fits at least partially within the thru-hole of the substantially rigid body.

10. The apparatus of claim 9, wherein the nozzle is coupled to the thru-hole of the substantially rigid body.

11. An automobile fuel system pressurization apparatus, comprising:
    a filler neck sealing element, comprising:
        a substantially rigid body, having a thru-hole centrally disposed therein, and
        a substantially deformable body that sits on an interior surface of the substantially rigid body, the substantially deformable body being configured to provide
        a substantially air-tight seal against an outer edge of a filler neck of a fuel tank; and
    an air pump, comprising a cylinder with an interior for housing compressed air and a nozzle, coupled to the interior and connected to a hand grip, that fits at least partially within the thru-hole of the substantially rigid body such that a surface of the handgrip abuts the substantially rigid body, the air pump being configured to supply compressed air through the filler neck sealing element and release a portion of compressed air from the interior of the air pump into the fuel tank.

12. The apparatus of claim 11, wherein the air pump further comprises an axially movable piston rod configured to configured to partially retract into the cylinder.

13. The apparatus of claim 11, wherein the filler neck sealing element is fixed onto the air pump.

14. The apparatus of claim 1, wherein the substantially deformable body comprises a foam-based material.

15. The apparatus of claim 11, wherein the substantially deformable body is configured as a ring.

* * * * *